United States Patent [19]

Pettingell et al.

[11] 4,055,998
[45] Nov. 1, 1977

[54] WAVEFORM COUNT OF TEETH ON AN INTERNAL COMBUSTION ENGINE FLYWHEEL

[75] Inventors: James R. Pettingell, Granby; Lee R. Armstrong, Enfield, both of Conn.

[73] Assignee: United Technologies Corporation, Hartford, Conn.

[21] Appl. No.: 747,755

[22] Filed: Dec. 6, 1976

[51] Int. Cl.² .......................................... G01M 15/00
[52] U.S. Cl. .............................................. 73/119 R
[58] Field of Search ...................... 73/118, 116, 117.2, 73/117.3, 517 R, 517 A, 119 R

[56] References Cited

U.S. PATENT DOCUMENTS

| | | | |
|---|---|---|---|
| 3,581,561 | 6/1971 | Tomashek | 73/117.2 |
| 3,657,922 | 4/1972 | Sibeud | 73/117.3 |
| 3,697,865 | 10/1972 | Smith et al. | 73/118 X |

Primary Examiner—Jerry W. Myracle
Attorney, Agent, or Firm—M. P. Williams

[57] ABSTRACT

The tooth-to-tooth time interval of teeth on a flywheel of a rotating internal combustion engine is recorded for at least a significant portion of an engine revolution, the variation in the time intervals are utilized to determine minima in the tooth-to-tooth time intervals, thereby to separate the tooth-to-tooth time intervals to cylinder-by-cylinder groupings. The number of teeth from one minima to the next for a given number of cylinders is summed. The summation of the number of teeth may then be used as a measured count of the number of teeth on the flywheel of the engine; this measured count may be compared against industry standards if desired. In a second embodiment, the measured count is averaged on a per-cylinder basis, and the tooth count for each cylinder is compared therewith and any data more than 20% off the average is eliminated from final computation of an average number of teeth for a given number of cylinders. The invention provides alternative use of engine cycle identification signals or engine tooth waveform analysis to measure the number of teeth on the flywheel.

9 Claims, 3 Drawing Figures

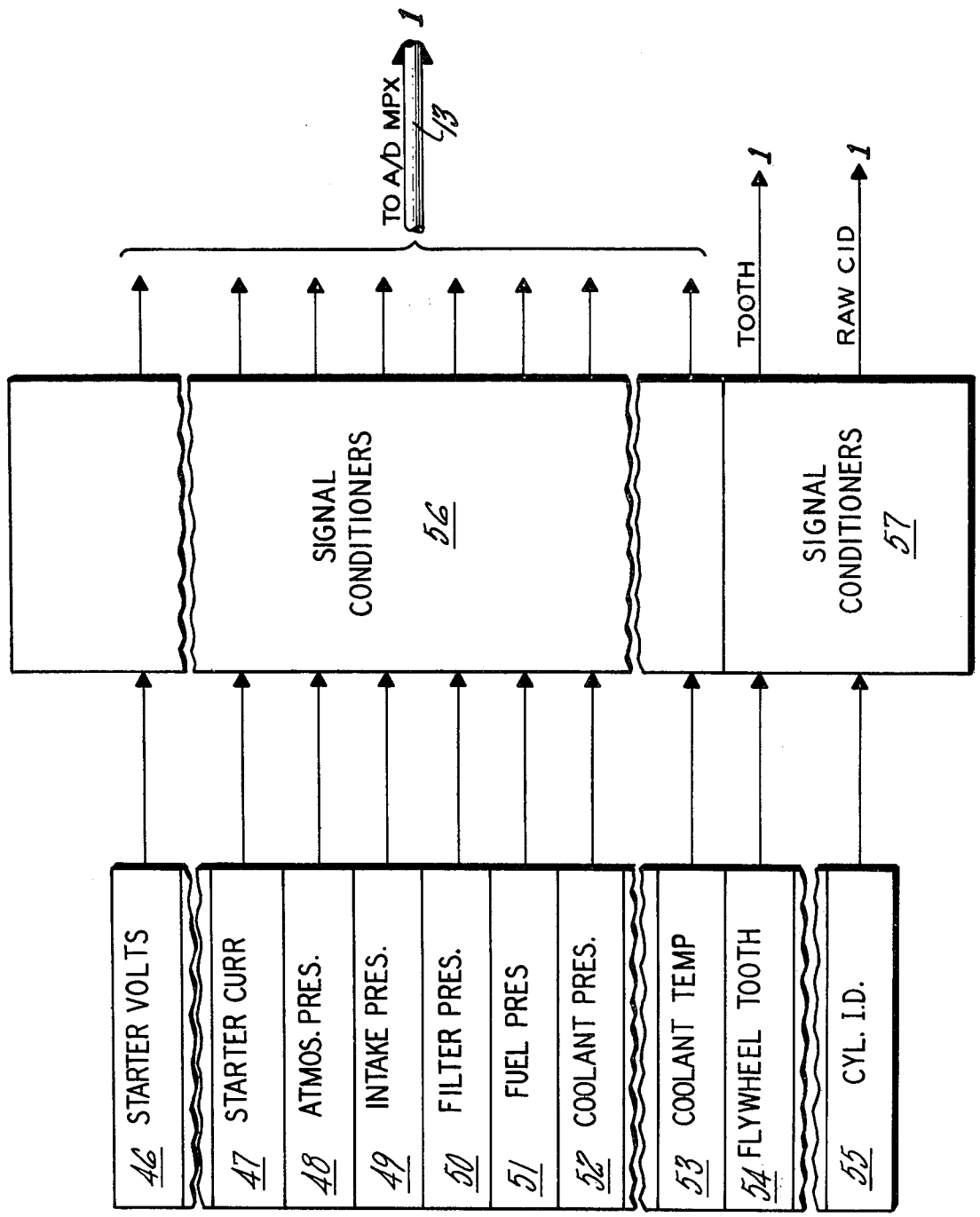

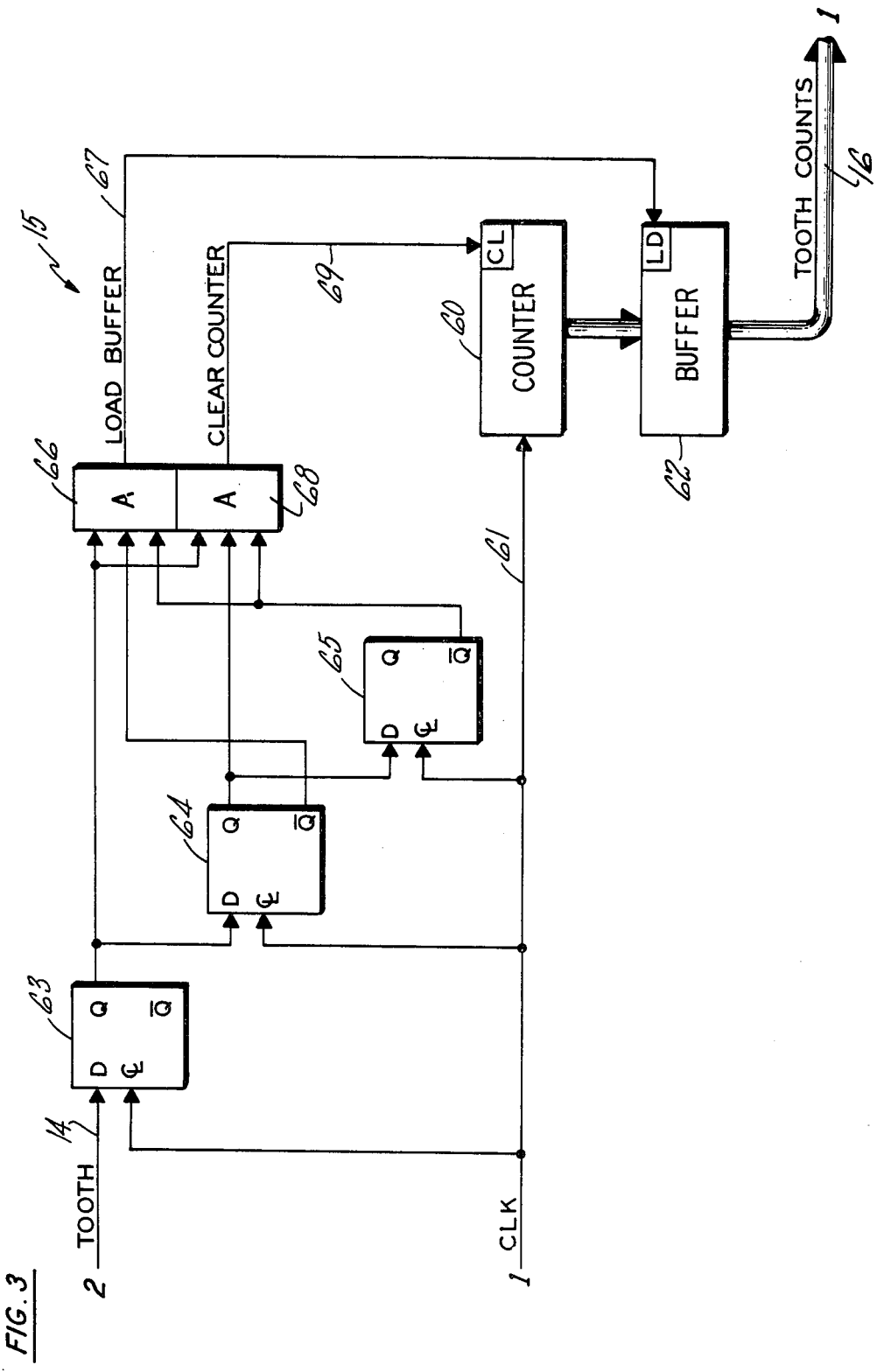

WAVEFORM COUNT OF TEETH ON AN INTERNAL COMBUSTION ENGINE FLYWHEEL

CROSS REFERENCE TO RELATED APPLICATIONS

This application is an improvement on, and discloses much of the subject matter of a commonly owned, copending application, Ser. No. 684,037, DETERMINATION OF NUMBER OF TEETH ON AN INTERNAL COMBUSTION ENGINE FLYWHEEL, filed on May 7, 1976 by Stick et al. The disclosure herein may utilize the teaching of a commonly owned, copending application, Ser. No. 684,221, ENGINE, CYLINDER IDENTIFICATION (CID) TRANSDUCER, filed on May 7, 1976 by Tedeschi.

BACKGROUND OF THE INVENTION

1. Field of the Invention

This invention relates to determining the number of teeth of a flywheel, by waveform analysis of flywheel tooth speed, or alternatively by engine cycle signals.

2. Description of the Prior Art

In the aforementioned application of Stick et al, the utilization of flywheel teeth to determine speed of an internal combustion engine in order to accommodate sophisticated internal combustion engine diagnostics, and the manner of determining the number of teeth in the flywheel for such speed computations is set forth. In that application, the number of teeth on the flywheel is determined by counting the teeth through a full cycle or engine revolution as indicated by a proximity sensor mounted on a member (such as a rocker arm) of the engine so as to provide a signal at an identical point in successive engine cycles.

In some instances, a suitable proximity sensor might not be mounted on an engine where certain diagnostics are to be performed. Particularly if only one or two tests requiring speed are desired, it may not be worthwhile to mount a transducer suitably on an engine, particularly if such engine requires hole drilling or other modifications in order to accommodate the transducer.

SUMMARY OF THE INVENTION

The object of the present invention is to provide for measuring the number of teeth on a flywheel of an internal combustion engine without a cycle determining signal, and further to provide for such a determination as an automated alternative to a determination of flywheel teeth made with the aid of a cycle determining signal.

According to the present inention, the intervals of time between passage of teeth of a flywheel past a tooth sensing means is utilized to analyze the cyclic character of the speed of the engine, thereby to break down the counting of teeth into a known relationship with respect to an engine revolution. In further accord with the present invention, the aforementioned analysis of tooth times is used as an automatic alternative to counting of teeth in between engine cycle signals, so that engine cycle signals can be used where available, and tooth time analysis is otherwise automatically used.

The present invention provides the capability for determining the number of teeth of the flywheel whether or not engine cycle identification signals are available in the engine under test. This facilitates the making of a few tests requiring tooth-to-tooth time analysis for speed determinations, without the need of mounting a cycle-determining transducer on the engine. The invention is readily implemented in available technology, and can take advantage of precise tooth determination by comparison with tables of standard numbers of flywheel teeth as established in the industry.

The present invention can utilize a raw analysis of tooth-to-tooth time intervals, or can by comparison of the measured data increase the quality thereof, in dependence upon the embodiments thereof disclosed herein which may be utilized as a matter of choice.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 2 is a simplified block diagram of engine parameter sensing apparatus for use in the embodiment of FIG. 1; and FIG. 3 is a simplified schematic diagram of tooth timer means for obtaining instantaneous, sub-cyclic engine speed in the embodiment of FIG. 1.

DESCRIPTION OF THE PREFERRED EMBODIMENTS

Figure 1:
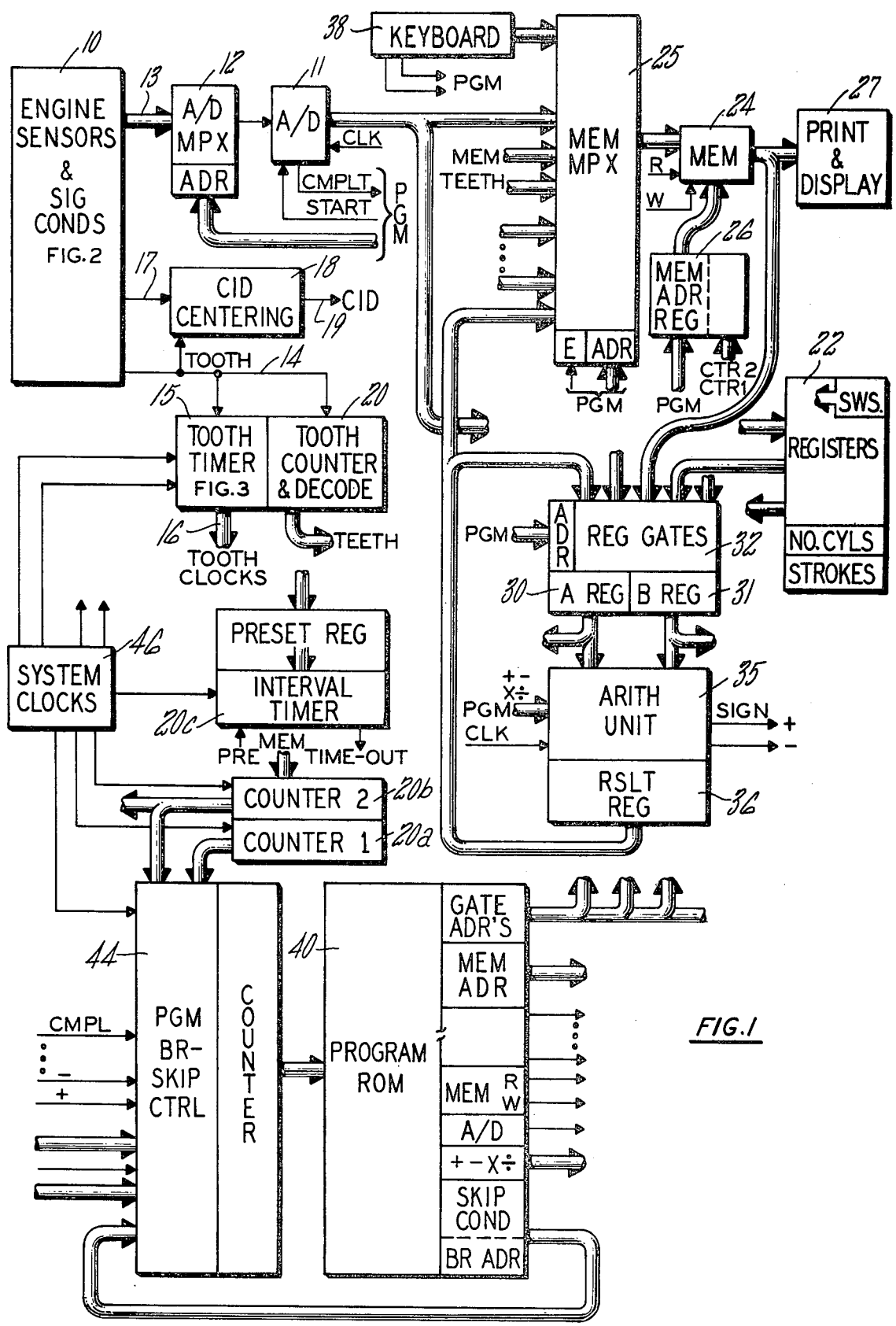
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. These outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped one or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 measure the intake manifold air pressure, a filter pressure transducer 50 to measure the pressure of the fuel downstream of the fuel inlet filter, a fuel pressure transducer 51 to to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flops 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counter in the counter 60. Whenever the tooth signal disappears, (which is totally immaterial) the next three clock signals in a row will cause resetting of the flip flops 63-65, in turn, since each of their D inputs will go down. The counter and the buffer are independent of the resetting of the flip flops 63-65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al, Ser. No. 684,037, entitled DETERMINATION OF NUMBER OF TEETH ON AN INTERNAL COMBUSTION ENGINE FLYWHEEL. Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)" indicate addresses, chosen at will by the programmer, or partially determined by counter two, if so indicated.

The present invention is disclosed generally in terms of a diagnostic system adapted to diagnose a six-cylinder four stroke engine. However, factors which may be altered to accommodate other types of engine (different numbers of cylinders, or two stroke engines, and the like) are described hereinafter.

The present invention is an improvement over the determination of flywheel teeth set forth in the aforementioned Stick et al application. In that case, a cylinder identification signal is utilized to determine a complete engine cycle (which is two revolutions in a four stroke engine), and the teeth on the flywheel are counted between two successive ones of such cycle-delineating signals. The present invention provides the capabilty of determining the number of teeth on a flywheel when there has been no probe positioned on the engine to provide the cylinder identification signals used in the Stick et al application. For completeness, the exemplary disclosure of the Stick et al application is included herein, and the modifications of the present invention are simply added thereto. The first task is to determine whether or not a cylinder identification signal is sensed within a given interval of time. If it is, then tooth counting is accomplished as set forth in instructions 3-8 herein and in the aforementioned Stick et al application. If it is not, then the program will branch to instruction 40 which provides the waveform analysis of the speed at which teeth pass a tooth sensor so as to determine the cyclic pattern of engine speed, from which revolutions of the engine can be delineated and the tooth count can be made. When the tooth count is completed (in one embodiment at instruction 98a, and in a more refined embodiment at instruction 134), so that regardless of how the number of teeth are initially measured, the comparison with standard numbers beginning at instruction 8 can proceed in the same fashion as disclosed both in the Stick et al application and herein in connection with instructions 8–39.

To determine whether the cylinder identification signal is present within a given time interval or not, the following instructions may be used:

| | | |
|---|---|---|
| 1a. | Preset interval timer | |
| 1b. | Skip one if CID | |
| 1c. | Branch to 2a | |
| 1d. | Branch to 3 | |
| 2a. | Skip one if time-out | |
| 2b. | Branch to 1b | |
| 2c. | Branch to 40 | |

If the cylinder identification signal is sensed, the program has branched to instruction 3, and the measuring of the teeth is accomplished by sensing the teeth and counting them from one cylinder identification signal to another. If desired, the cylinder identificaion signal can be made more repetitively accurate by utilizing the apparatus of the aforementioned copending application of Tedeschi, which shows in greater detail the CID centering apparatus 18 of FIG. 1 herein. The tooth counterand decode 20 is presumed herein to be a counter which can be started and stopped by the program and will count all of the tooth signals on the line 14 in-between. The manner of determining the count of teeth between CID signals may be in accordance with the following instruction steps:

| | |
|---|---|
| 3. | Start Tooth Counter |
| 4. | Skip one if CID |
| 5. | Branch to 4 |
| 6. | Stop Tooth Counter |
| 7. | Load Tooth Counter to A REG |
| 8. | Load 2 Factor to B REG |
| 9. | Divide |
| 10. | Load RSLT to MEM (Count) |

On the other hand, in the event that no CID signal is sensed by the time that the interval timer times out, the program will branch to instruction 40 to measure the number of teeth in accordance with the present invention by waveform analysis of the sub-cyclic speed of the flywheel.

For simplicity in separating the teachings of the aforementioned Stick et al application from those of the present invention, the following description is in the same order as in the Stick et al application, and describes how the tooth comparison is done in the Stick et al application. Thereafter, exemplary processing in accordance with the present invention is described in connection with instructions 40–139.

The number of teeth in a full engine cycle are measured, and this is related to a single revolution (for a four stroke engine) by dividing it by two. Then comparison is made with each of a standard number of teeth which have been loaded into memory or are provided in any other suitable fashion, starting with the lowest number of teeth and proceeding to the higher number. The first pass through the entire number of teeth is made by comparing the measured number with exactly the numbers in the table, without any leeway. If no exact comparison is successful, then comparison is made within one tooth, starting with the lowest number and ending with the highest number. If still there is no match, then a third pass is made where the number that is measured is compared with each of the standard numbers plus or minus two teeth (a five tooth leeway) starting with the lowest number and ending with the highest number. If that fails, then the measured number is displayed. This provides an indication of error and also gives the operator the choice to select the measured number if he thinks perhaps the measured number is correct for some reason, or to select a number which the operator may feel is most likely the correct number. In addition to error being indicated by displaying the measured number, an additional error, such as a light or an error message, may be made to an operator if desired.

Two counters are utilized in the exemplary tooth-matching process herein. Counter 1 is used simply to determine whether the comparison is to be made plus or minus zero, plus or minus one or plus or minus two. Counter 2 is utilized to keep track of the particular standard number of teeth located in the table in memory just being compared at the moment. In the present embodiment, it is assumed that there are eight possible standard numbers of teeth which the flywheel of the engine under test may have. These are equivalent to industry standards on a very large percentage of the diesel engines in common use today: 92, 102, 103, 113, 118, 119, 142, and 152. Because these numbers are in some instances only one tooth apart, it is desirable to first compare to see if any of them are exactly alike, before comparing with three and five tooth leeways (plus or minus one, plus or minus two). In addition, in order to use a common arithmetic unit for comparison purposes, wherein the sign changes only if an inverse subtraction is made, the exemplary process herein compares each of the standard numbers with the measured number by first determining whether the measured number is larger than the standard number, by subtracting (at instruction 20) the measured number from the standard number less 1, in which case a negative result indicates passing of the test because the measured number must be higher than the standard number less 1. And then in instruction 24 hereinafter, the standard number plus 1 is subtracted from the measured number, and it must be greater than the measured number in order to pass the test. In other words, the measured number is actually compared against a bracketing of the standard number to determine if it is greater than the standard number less 1 and less than the standard number plus 1. Whenever a failure occurs on either the first or the second test, the process determines whether it's through the comparison or not, and if not, goes back to compare against the next item in the table, until the table is complete. Whenever a failure is indicated for the last number in the table, if two sets of comparisons have not been made three time (plus or minus zero, plus or minus one, plus or minus two), then the permissible increment is increased by branching from instruction 32 to instruction 13; but if all three passes have been made, then the measured amount is displayed and the process is ended. Whenever the second test indicates passage, the process ends by loading the value of the table that successfully passed both tests into the memory location where the measured amount had been stored.

A detail process in the exemplary diagnostic apparatus described hereinbefore may be according to the following instructions:

|   |     |                                |
|---|-----|--------------------------------|
|   | 11. | Reset Counter 1                |
| START | 12. | Advance Counter 1          |
| OF | 13. | Reset Counter 2               |
| COMPARE | 14. | Advance Counter 2        |
|   | 15. | Load MEM (Ctr 2) to A REG      |
|   | 16. | Load Counter one to B REG      |
|   | 17. | Subtract                       |
|   | 18. | Load RSLT to A REG             |
|   | 19. | Load MEM (Count) to B REG      |
| PASS LO | 20. | Subtract; Skip one if −    |
| FAIL LO | 21. | Branch to 29               |
|   | 22. | Load MEM (Ctr 2) to A REG      |
|   | 23. | Load Counter 1 to B REG        |
|   | 24. | Add                            |
|   | 25. | Load RSLT to B REG             |
|   | 26. | Load MEM (Count) to A REG      |
| FAIL HI | 27. | Subtract; Skip one if +    |
| PASS HI | 28. | Branch to 36               |
|   | 29. | Skip one if Counter 2 = 8      |
|   | 30. | Branch to 14                   |
|   | 31. | Skip one if Counter 1 = 3      |
|   | 32. | Branch to 12                   |
| NONE | 33. | Load MEM (Count) to Display   |
|   | 34. | Display ERROR                  |
|   | 35. | END                            |
| EQUAL | 36. | Reset B REG                  |
|   | 37. | Load MEM (Ctr 2) to B REG      |
|   | 38. | Load B REG to MEM (Count)      |
|   | 39. | Branch to 35                   |

In exemplary data processing apparatus in which the present invention may be employed, the determination of the number of teeth on the flywheel is usually desired when a speed routine or other routine deriving speed or angular information from the tooth counter is desired. Since a program will proceed after finding the number of teeth with whatever routine required the tooth count, there is no need to display the amount selected from the table. The purpose of displaying the measured amount when it does not compare with any of the table amounts is to give the operator an indication that something is wrong, to provide an indication of why the program has hung up (which it will if a speed routine is waiting for the tooth count), and to give the opportunity to the operator to key in some tooth value from the keyboard, if he so desires. That function is simply a data loading operation which can be made in accordance with techniques well known in the art, and is not described herein.

The foregoing process is complete, and is as described in the aforementioned Stick et al application. However, when there is not cylinder identification signal (either due to malfunction or to having not placed a suitable transducer on the engine under test) the present invention provides a measure of teeth which can be utilized in the process described with respect to instructions 11–39 hereinbefore to determine a precise number of teeth, if possible.

The first step in a process utilizing the exemplary system described hereinbefore, collects tooth clocks (that is, counts of clock pulses acquired on a tooth-to-tooth basis) for a sufficient number of teeth to include at least a full revolution of a flywheel having a maximum number of teeth (such as 152). Since the engine speed varies as a consequence of compressional variations (both when idling and when being cranked by a starter) as well as by power strokes if idling, the time which elapses in the tooth-to-tooth intervals passing the tooth sensing transducer will also vary in a cyclic manner. When the engine is at a relatively higher speed momentarily, the number of clock pulses (such number being referred to as the tooth clocks herein) will be smaller; similarly when the instantaneous speed is slower, the tooth clocks will be higher. Instructions which illustrate a process of acquiring tooth clocks over at least a full revolution of any engine under test may be as follows:

| 40. | Reset Counter 1 |
|-----|-----------------|
| 41. | Reset Counter 2 |
| 42. | Skip one if Tooth |
| 43. | Branch to 42 |
| 44. | Load Tooth timer to MEM (Tooth - Ctr 2) |
| 45. | Advance Counter two |
| 46. | Skip one if Counter two = 200 |
| 47. | Branch to 42 |
| 48. | Reset Counter two |

The next step, which is intricately involved in the invention herein, is to determine the minima of tooth clocks, which will break up the pattern of tooth clocks into cylinder-by-cylinder groupings. In the exemplary process herein, the minima are determined by taking the lowest tooth clock for the first 40 teeth and retaining the identification of the tooth for which that is determined, the counting of teeth being maintained in counter two. This may be done in the exemplary process in accordance with the following instructions:

| 49. | Load MEM (Tooth - Ctr 2) to A REG |
|-----|-----------------------------------|
| 50. | Advance Counter two |
| 51. | Load MEM (Tooth - Ctr 2) to B REG |
| 52. | Subtract |
| 53. | Skip two if + |
| 54. | Load Counter two to MEM (Min - Ctr 1) |
| 55. | Load B REG to A REG |
| 56. | Advance Counter two |
| 57. | Skip one if Counter 2 = 40 |
| 58. | Branch to 51 |

And, a test is made to see if this has been done for the requisite number of cylinders, which may be as follows:

| 59.  | Advance Counter one |
|------|---------------------|
| 59a. | Load REG (No. Cyls) to B REG |
| 59b. | Load Counter 1 to A REG |
| 60.  | Subtract |
| 61.  | Skip 1 if − |
| 62.  | Branch to 72 |

If not, the process returns to the last determined minima, skips the next ten teeth (because no valid minima could occur ten teeth after a previous valid minima) and again examines the next 40 teeth for the minimum tooth count; the skipping of ten teeth may be in accordance with the following process:

| 63. | Load MEM (Min - Ctr 1) to Counter two |
|-----|---------------------------------------|
| 64. | Load 9 Factor to A REG |
| 65. | Load 1 Factor to B REG |
| 66. | Advance Counter 2 |
| 67. | Subtract |
| 68. | Load RSLT to A REG |
| 69. | Skip one if − |
| 70. | Branch to 65 |
| 71. | Branch to 49 |

When as many passes have been made as there are cylinders, the test done in instructions 59–62 will cause branching to instruction 72. The next step in the process is to subtract the tooth identity of the tooth for which a minima was determined from the tooth identity of the tooth for which the next minima in sequence was determined so as to provide numbers indicative of the number of teeth between the minima. Since the identification of the teeth were minima have been found is stored by instruction 54 into a particular location in memory relating to minima and identified by counter one as to which of the minima is concerned (ostensibly, one for each cylinder when everything is working properly), the subtraction may proceed in a caterpillar fashion; but since it is not normally easy to decrement a counter, but only to advance it, counter two (which is no longer being utilized to keep track of the gross numbers of teeth) is used to trail behind counter one by one count. Thus, the setting of counter two is always one behind counter one, and therefore will be pointing at the lower of the two numbers in the subtraction. This may be in accordance with the following instructions:

| 72. | RESET Counter 1 |
|---|---|
| 73. | RESET Counter 2 |
| 74. | Advance Counter 1 |
| 75. | Load MEM (Min - Ctr 1) to A REG |
| 76. | Load MEM (Min - Ctr 2) to B REG |
| 77. | Subtract |
| 78. | Load RSLT to MEM (Min - Ctr 2) |
| 79. | Advance Counter 2 |

And again a test is made to determine when the number of subtractions made equals the number of cylinders in the engine under test, as follows:

| 80. | Load REG (No. Cyls) to B REG |
|---|---|
| 81. | Load Counter 1 to A REG |
| 82. | Subtract |
| 83. | Skip 1 if + |
| 84. | Branch to 74 |
| 85. | Reset Counter 2 |

When the counts of the number of teeth between the minimas, ostensibly one per cylinder, are all stored in memory at the address allocated for the minima, then the next step is to sum these together so as to determine the total number of teeth for a full revolution (which is the same function being performed in instructions 3-7 herein and in the aforementioned Stick et al application when a cylinder identification signal is available). This may be done in accordance with the following exemplary process:

| 86. | Reset Counter 1 |
|---|---|
| 87. | Load MEM (Sum) to A REG |
| 88. | Load MEM (Min - Ctr 1) to B REG |
| 89. | Add |
| 90. | Load RSLT to MEM (Sum) |
| 91. | Advance Counter 1 |
| 92. | Load REG (No. Cyls) to B REG |
| 93. | Load Counter 1 to A REG |
| 94. | Subtract |
| 95. | Skip 1 if + |
| 96. | Branch to 86 |
| 97a. | Load MEM (Sum) to A REG |
| 98a. | Branch to 8 |

The foregoing, however, does not account for any radical errors in sensing of the minima, which can occur as a consequence of noise in the data determined by the tooth timer as a result of noisy fluctuations which attend proximity sensing of the passage of flywheel teeth. However, in a rudimentary embodiment of the invention, the count provided in instructions 86-98a may be adequate and can be utilized if desired. In accordance with further aspects of the invention, however, another embodiment of the invention does not include instructions 97a and 98a as shown hereinbefore, but instead provides a test (begining with instructions 97b and 98b) to determine how accurate the information is, and to modify it if necessary to make it more accurate. To check the quality of the measured tooth count, the measured tooth count for the total number of cylinders (as determined hereinbefore) is averaged so as to determine the average tooth count per cylinder, and each tooth count per cylinder is compared against 20% of that average. The particular instruction format for finding the average has a wrinkle in it that allows it to be used to find the average in order to perform the check against 20% thereof, and to use it later in order to normalize the corrected data, as is described more fully hereinafter. The wrinkle is subtracting the count in counter two from the number of cylinders so that when the corrected data is averaged out for restoration to a normalized amount, it will take into account the fact that some of the data relating to some of the cylinders is not used, so that a smaller number has to be utilized in order to determine a correct average which then can be multiplied by the total number of cylinders to provide a normalized amount. But during the first pass, when the average is being determined for the 20% check, counter two is set at zero (by instruction 85, hereinbefore) so that is does not affect the averaging process. The average may be determined as follows:

| 97b. | Load REG (No. Cyls) to A REG |
|---|---|
| 98b. | Load Counter 2 to A REG |
| 99. | Subtract |
| 100. | Load RSLT to B REG |
| 101. | Load MEM (Sum) to A REG |
| 102. | Divide |

If the average is being performed as a precursor to performing the 20% check, counter two is still set at zero from instruction 85, so that it does not cause branching to the normalization routine but instead will pick up with the data checking routine at instruction 105. This may be achieved as follows:

| 103. | Skip 1 if Counter 2 = 0 |
|---|---|
| 104. | Branch to 135 |

In order to perform the test, 20% of the average is determined by dividing by five, and this then is compared with each of the minimum to minimum counts of teeth which were achieved hereinbefore. The comparison is made by subtracting the squares since this will deal in absolute values, it being immaterial whether any one reading is above or below the average by 20%, and squaring eliminates the signs. Thus, the first procedures are to find the square of 20% of the average as follows:

| 105. | Load RSLT to MEM (Avg) |
|---|---|
| 106. | Load 5 Factor to B REG |
| 107. | Divide |
| 108. | Load RSLT to A REG |
| 109. | Load RSLT to B REG |
| 110. | Multiply |
| 111. | Load RSLT to MEM (20%) |

Thereafter, each of the minimum to minimum counts of teeth are brought out, the average is subtracted therefrom, the result is squared and the square of the 20% is subtracted therefrom, as follows:

| | |
|---|---|
| 112. | RESET Counter 1 |
| 113. | Load MEM (Min - Ctr 1) to A REG |
| 114. | Load MEM (Avg) to B REG |
| 115. | Subtract |
| 116. | Load RSLT to A REG |
| 117. | Load RSLT to B REG |
| 118. | Multiply |
| 119. | Load RSLT to A REG |
| 120. | Load MEM (20%) to B REG |
| 121. | Subtract |

Any time that the difference between one of the minimum to minimun tooth counts and the average thereof is more than 20%, the result will be negative and so it can be ignored (that is, the data passed the test). But if the result is positive, this means that the individual reading is more than 20% different from the average, so counter two is advanced to indicate that the reading for one of the cylinders is off by more than 20%, and that reading is changed to zero so that it will be ignored in a further summation of the readings, as is described more fully hereinafter. And then the process is repeated until the number of cylinders in the engine have all been tested to be sure they are within 20% of the average of the data. Exemplary instructions for these functions are as follows:

| | |
|---|---|
| 122. | Skip two if − |
| 123. | Advance Counter 2 |
| 124. | Load ZEROs to MEM (Min - Ctr 1) |
| 125. | Advance Counter 1 |
| 126. | Load REG (No. Cyls) to B REG |
| 127. | Load Counter 1 to A REG |
| 128. | Subtract |
| 129. | Skip 1 if + |
| 130. | Branch to 113 |

If at the end of the test, counter two hasn't been set, then this means that all of the data has passed. On the other hand, if any of the data fails, then a new summation is made, all the faulty data having been reduced to zero, and counter two indicating how many units of faulty data have been reduced to zero. But, if counter two is zero, then a correct result exists in the summation storage location of memory (which is equivalent to the count of teeth achieved in instructions 3–7 hereinbefore and in the aforementioned Stick et al application) so that the program can return to instruction 8. This may be achieved as follows:

| | |
|---|---|
| 131. | Skip 1 if Counter 2 = 0 |
| 132. | Branch to 86 |
| 133. | Load MEM (Sum) to A REG |
| 134. | Branch to 8 |

Should there have been faulty data, which was reduced to zero in its storage locations, and the number of them found to be faulty being lodged in counter two, then a new summation is made in instructions 86–96 as described hereinbefore. This time, however, counter two is not set at zero when the summation is completed so it is known that the summation has to be normalized by dividing the summation by a number which is less than the number of cylinders, by an amount equal to the number of items of faulty data which were reduced to zero; this provides a per-cylinder average for that data which was determined to be alright, which then must be normalized to the full numbers of cylinders by multiplying by the number in the cylinder register. This may be achieved as follows:

| | |
|---|---|
| 135. | Load RSLT to A REG |
| 136. | Load REG (No. Cyls) to B REG |
| 137. | Multiply |
| 138. | Load RSLT to MEM (Sum) |
| 139. | Branch to 133 |

Thus, in the improved embodiment herein, a first check of the data is made, and any data which is more than 20% off the average is thrown out, and the remaining data is normalized to provide a more accurate count. Thereafter, the program returns to instruction 8 to do standard tooth matching, if desired. However, it should be understood that the invention herein, determination of indicia on the rotary member of an internal combustion engine by analysis of the cyclic behavior of the speed thereof, may be practiced without utilizing the tooth count comparisons of the aforementioned Stick et al application, if desired.

In the foregoing analysis, the number of cylinders has been taken to be the number of minima to be analyzed. However, other numbers may be used, as long as they are kept track of. For instance, 8 minima or 13 minima or 20 minima may be utilized if desired, provided only that enough tooth counts are made so as to permit such a large analysis, and such particular number is utilized instead of the number of cylinders, where appropriate. Similarly, it isn't necessary to use a full cycle of the engine, a single revolution or even less than a revolution could be used, although it is doubtful that accurate data could be acquired thereby.

It should also be understood that it is immaterial if the engine is idling slowly, or if it is being cranked when this tooth count determination is being made.

If desired, tests may be provided to insure that the engine is turning by utilizing an assumed number of teeth in a speed measuring process such as is disclosed and claimed in a commonly owned, copending application, Ser. No. 684,219, SUB-CYCLIC SPEED AND CYCLIC TIME MEASUREMENTS FOR INTERNAL COMBUSTION ENGINE HORSEPOWER INDICATION, filed on May 7, 1976 by Willenbecher et al. However, it is obvious that no information will be derived and therefore no harm will be done should the test be inadvertently attempted while the engine is standing still. In any event, these considerations are outside the scope of the present invention.

The invention may also be practiced utilizing the determination of maxima and/or minima in a more complicated fashion than that described in instructions 49–58 herein, such as is disclosed in a commonly owned, copending application, Ser. No. 684,038, RELATIVE COMPRESSION OF AN INTERNAL COMBUSTION ENGINE, filed on May 7, 1976 by Benedict.

Thus, although the invention has been shown and described with respect to exemplary embodiments thereof, it should be understood by those skilled in the art that the foregoing and various other changes, omissions and additions may be made therein and thereto without departing from the spirit and the scope of the invention.

Having thus described a typical embodiment of our invention, that which we claim as new and desire to secure by Letters Patent is:

1. Apparatus for determining the number of indicia on a member of an internal combustion engine directly connected to and rotating with the crankshaft of the engine, comprising:

sensing means adapted to be disposed to sense the passage of each of the indicia of the engine member when the engine is rotating, said means providing a sense signal each time that an indicium of the member passes in proximity to said sensing means; and processing means responsive to the sense signals presented by said sensing means to generate manifestations indicative of the time intervals between said sensing means sensing successive indicia over a time period which is at least a significant portion of one revolution of the engine, and responsive to the variations in said time intervals to identify the number of indicia sensed across an integral number of cylinder-related subcycles of an engine cycle and for generating a data manifestation indicative of the total number of said indicia on said member and available to be sensed in a complete revolution of said engine.

2. Apparatus according to claim 1 in which the member is a flywheel and the indicia are teeth on the flywheel and wherein:

said sensing means is a tooth proximity sensor issuing a tooth signal as said sense signal.

3. Apparatus for determining the number of teeth on the flywheel of an internal combustion engine comprising:

tooth sensing means adapted to be disposed to sense the passage of each tooth of the flywheel of an internal combustion engine when the engine is rotating, said means providing a tooth signal each time that a tooth of the flywheel passes in proximity to said tooth sensing means;

processing means responsive to the tooth signals presented by said tooth sensing means to generate manifestations indicative of the time intervals between said tooth sensing means sensing successive teeth over a time period which is at least a significant portion of one revolution of the engine, and responsive to the variations in said time intervals to identify the number of teeth sensed within each one of an integral number of cylinder-related subcycles of an engine cycle and for generating therefrom a manifestation of the total number of teeth on the flywheel of the engine.

4. Apparatus according to claim 3 wherein said processing means further comprises:

means for determining the average number of teeth sensed within a cylinder-related subcycle, for comparing the number of teeth sensed within each one of said cylinder-related subcycles to said average number, and for generating a corrected manifestation of the total number of teeth on the flywheel of the engine from only the numbers of teeth sensed for each cylinder-related subcycle which is within a given amount of said average number.

5. Apparatus for determining the number of teeth on the flywheel of an internal combustion engine comprising:

tooth sensing means adapted to be disposed to sense the passage of each tooth of the flywheel of an internal combustion engine when the engine is rotating, said means providing a tooth signal each time that a tooth of the flywheel passes in proximity to said tooth sensing means;

means for registering a plurality of standard data manifestations, each one representing a number indicative of a number of teeth permissible on a flywheel of an internal combustion engine of the type under test as established by industry standards;

processing means responsive to the tooth signals presented by said tooth sensing means to generate manifestations indicative of the time intervals between said tooth sensing means sensing successive teeth over a time period which is at least a significant portion of one revolution of the engine, and responsive to the variations in said time intervals to identify the number of teeth sensed across an integral number of cylinder-related subcycles of an engine cycle and for generating a measured data manifestation therefrom, and responsive to said registering means for comparing said measured data manifestation with each of said standard data manifestations and for selecting one of said standard data manifestations as a result of the comparison; and means for presenting the selected one of said standard data manifestations as the determined number of teeth on the flywheel of the engine under test.

6. Apparatus for determining the number of teeth on the flywheel of an internal combustion engine comprising:

tooth sensing means adapted to be disposed to sense the passage of each tooth of the flywheel of an internal combustion engine when the engine is rotating, said means providing a tooth signal each time that a tooth of the flywheel passes in proximity to said tooth sensing means;

identification means adapted to be disposed for response to the presence of a particular member of the engine under test in a manner to present a signal corresponding to a known angle of revolution of the engine greater than the angle included by a plurality of said teeth, and for generating an ID signal in response to said engine member being in proximity with said identification means;

processing means, responsive to the tooth signals presented by said tooth sensing means and to said identification means when said identification means is disposed for response to said engine member, for measuring the number of said tooth signals provided as the engine rotates through a known angle determined by said ID signals and presenting a measured data manifestation indicative of the number of teeth on said flywheel when said ID signals are present, and alternatively, when said ID signals are not present, responsive to the tooth signals presented by said tooth sensing means to generate manifestations indicative of the time intervals between said tooth sensing means successive teeth for a number of teeth corresponding to at least a significant portion of one revolution of the engine, and responsive to the variations in said time intervals to identify the number of teeth sensed across an integral number of cylinder-related subcycles of an engine cycle and for generating said measured data manifestation therefrom.

7. In the method of determining the number of teeth on the flywheel of a slowly rotating internal combustion engine, the steps of:

electronically measuring the time intervals between the passage of corresponding successive ones of a large number of teeth of the flywheel past a fixed point;

maintaining a running count of teeth respectively corresponding to each of said time intervals;

from the magnitude of said time intervals, dividing said running count of teeth into cylinder-related subcycles of an engine revolution;

determining the number of teeth related to each of said subcycles; and relating the number of teeth in each subcycle to a number of teeth corresponding to a full revolution of the engine to provide a measured number of teeth on the flywheel thereof.

8. In the method according to claim 7, the additional steps of:

comparing the number of teeth related to each subcycle to an average number of teeth per subcycle; and relating the number of teeth for each of the subcycles which does not vary from the average of the subcycles by more than a given amount to a full revolution of the engine to provide a corrected measured number of teeth on the flywheel thereof.

9. In the method of determining the number of teeth on the flywheel of a slowly rotating internal combustion engine employing electronic processing apparatus including identification means adapted to be disposed for response to the presence of a particular member of the engine in a manner to present a cycle signal corresponding to a full engine cycle, and tooth sensing means adapted to be disposed to sense the passage of each tooth of the flywheel of the internal combustion engine when rotating, the steps of:

determining whether said identification means is providing said cycle signal;

if said cycle signal is present, counting the number of teeth sensed by said tooth sensing means between successive ones of said cycle signal to provide a measure of the number of teeth on the flywheel thereof; and, alternatively, if said cycle signal is not present, generating manifestations of the time intervals between the sensing of successive teeth over a number of teeth corresponding to at least a significant portion of one revolution of the engine, and responsive to the variation in said time intervals, identifying the number of teeth sensed across an integral number of cylinder-related subcycles of an engine cycle related said number to a full revolution of the engine to provide a measure of the number of teeth on the flywheel thereof.

* * * * *

UNITED STATES PATENT AND TRADEMARK OFFICE
CERTIFICATE OF CORRECTION

PATENT NO. : 4,055,998

DATED : November 1, 1977

INVENTOR(S) : James R. Pettingell; Lee R. Armstrong

It is certified that error appears in the above-identified patent and that said Letters Patent are hereby corrected as shown below:

Column 1, line 54     "inention" should read --invention--

Column 4, line 29     "one" should read --once--

Column 5, line 5     Cancel "to"

Column 6, line 5     "counter" should read --counted--

Column 7, line 34     "counterand" should read --counter and--

Column 8, line 62     "time" should read --times--

Column 9, line 50     "not" should read --no--

Column 12, line 26     "The" should read --This--

Column 16, line 52     After "means" insert --sensing--

Column 18, line 20     "related" should read --relating--

Signed and Sealed this

Fourth Day of July 1978

[SEAL]

Attest:

RUTH C. MASON
*Attesting Officer*

DONALD W. BANNER
*Commissioner of Patents and Trademarks*